INVENTORS
EUGENE E. HAWKE
WILLIAM A. MACKIE

Aug. 19, 1969

E. E. HAWKE ET AL 3,462,021

LOAD-RESISTING STRUCTURES MADE OF
THIN-WALLED, SQUARE TUBING
AND CONNECTED WITH NOVEL
SQUARE, NON-TWISTING
COUPLINGS

Filed Jan. 29, 1968

INVENTORS
EUGENE E. HAWKE
WILLIAM A. MACKIE

Aug. 19, 1969

E. E. HAWKE ET AL 3,462,021

LOAD-RESISTING STRUCTURES MADE OF
THIN-WALLED, SQUARE TUBING
AND CONNECTED WITH NOVEL
SQUARE, NON-TWISTING
COUPLINGS

Filed Jan. 29, 1968

INVENTORS
EUGENE E. HAWKE
WILLIAM A. MACKIE

Aug. 19, 1969
E. E. HAWKE ET AL
3,462,021
LOAD-RESISTING STRUCTURES MADE OF
THIN-WALLED, SQUARE TUBING
AND CONNECTED WITH NOVEL
SQUARE, NON-TWISTING
COUPLINGS
Filed Jan. 29, 1968
9 Sheets-Sheet 4
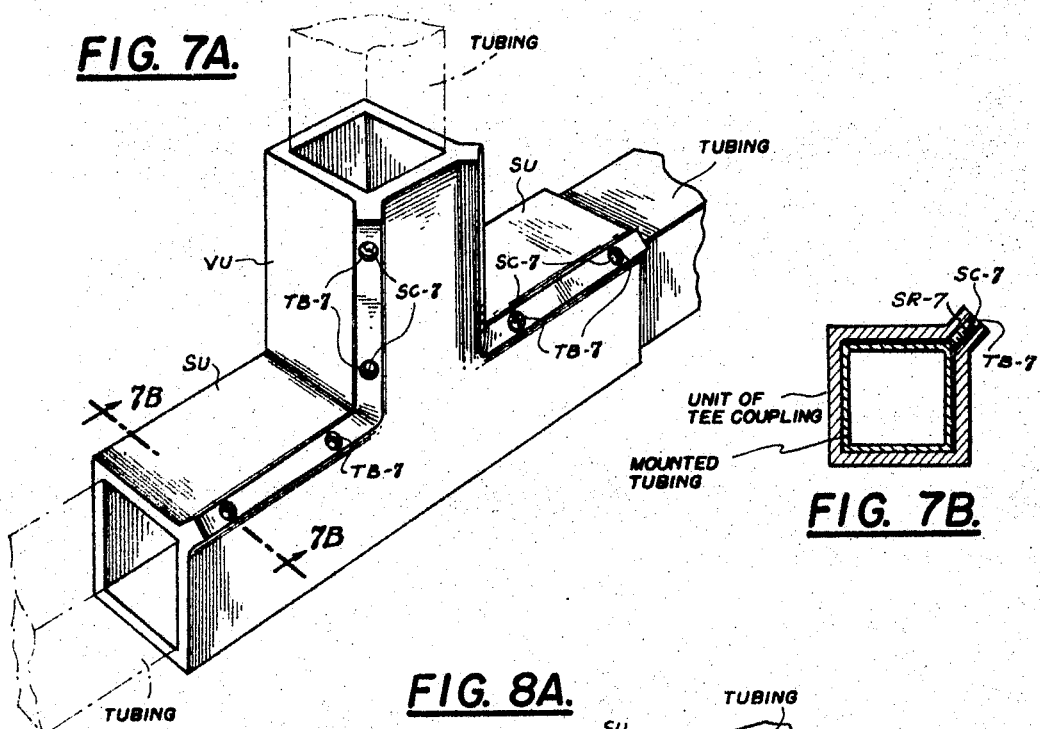
FIG. 7A.
FIG. 7B.
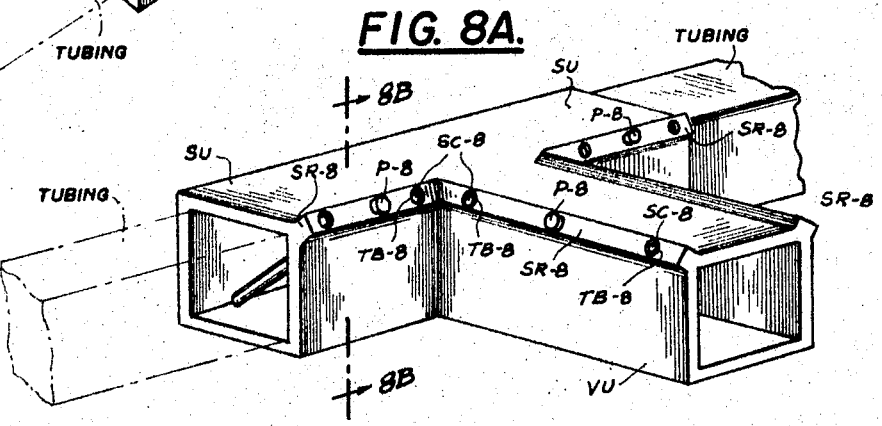
FIG. 8A.
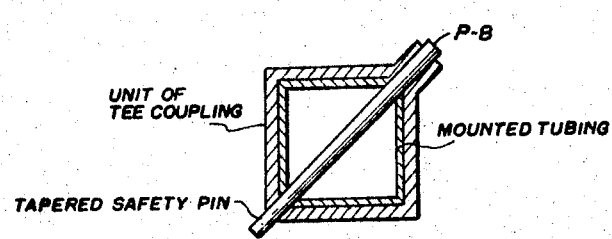
FIG. 8B.
INVENTORS
EUGENE E. HAWKE
WILLIAM A. MACKIE

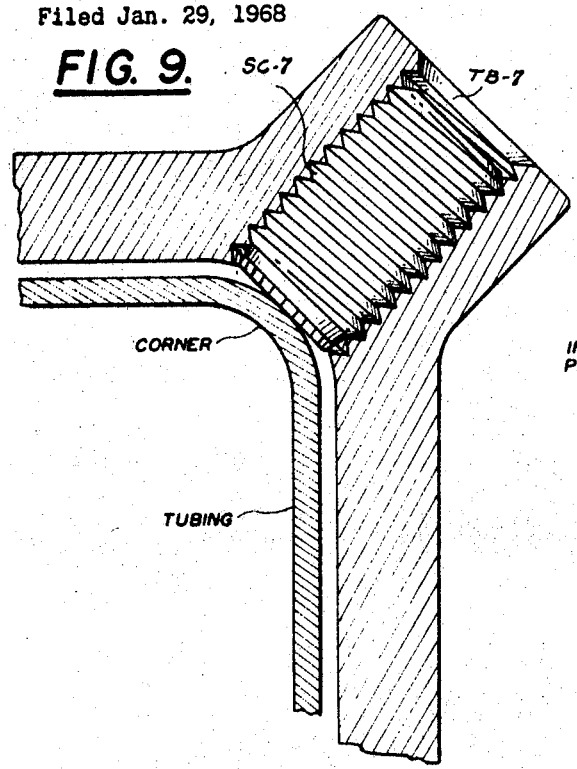
FIG. 9.
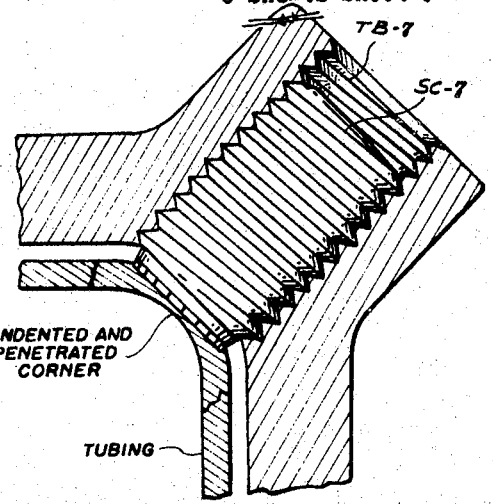
FIG. 10B.
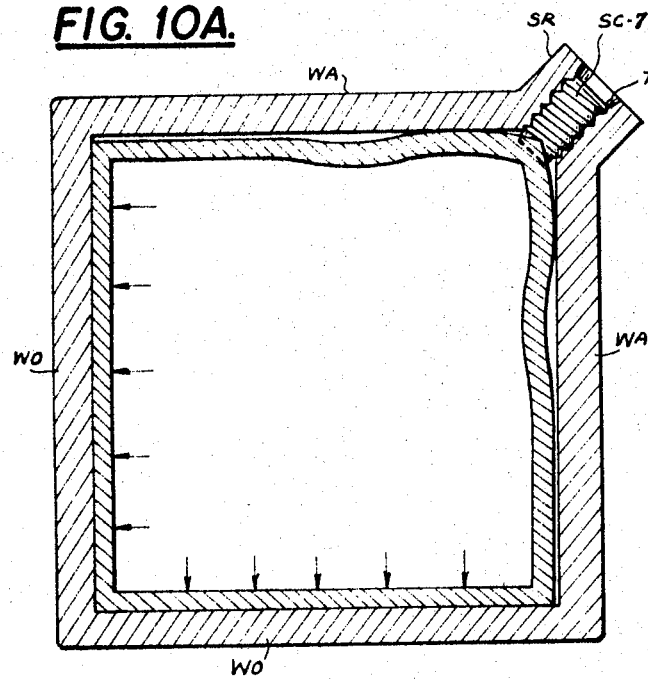
FIG. 10A.
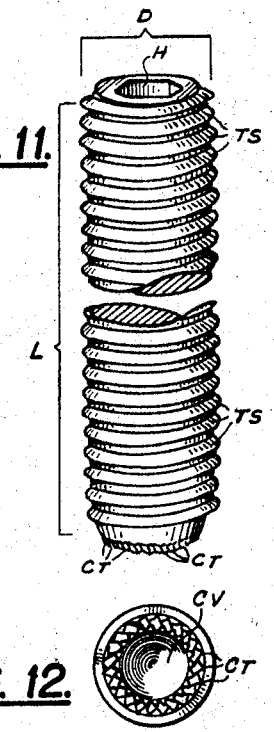
FIG. 11.
FIG. 12.

Aug. 19, 1969

E. E. HAWKE ET AL 3,462,021

LOAD-RESISTING STRUCTURES MADE OF THIN-WALLED, SQUARE TUBING AND CONNECTED WITH NOVEL SQUARE, NON-TWISTING COUPLINGS

Filed Jan. 29, 1968

INVENTORS
EUGENE E. HAWKE
WILLIAM A. MACKIE

3,462,021
LOAD-RESISTING STRUCTURES MADE OF THIN-WALLED, SQUARE TUBING AND CONNECTED WITH NOVEL SQUARE, NON-TWISTING COUPLINGS
Eugene E. Hawke, 14 Lonsdale Road, Toronto, Ontario, Canada, and William A. Mackie, Toronto, Ontario, Canada; said Mackie assignor to said Hawke
Continuation-in-part of application Ser. No. 387,884, Aug. 6, 1964. This application Jan. 29, 1968, Ser. No. 701,184
Int. Cl. A47f 5/01; F16l 19/02; A47b 45/00
U.S. Cl. 211—182                                  19 Claims

ABSTRACT OF THE DISCLOSURE

A load-resisting or load-supporting structure is provided which is comprised of thin-walled, square tubing connected with novel square, non-twisting couplings. The load-resisting or load-supporting structure is constituted of a plurality of horizontally and perpendicularly arranged square horizontal tubular members which are safely and securely joined together by means of the novel square, non-twisting couplings. These couplings have a novel construction including the provision of a rugged, strongly struction and provide new results. These results include great frictional forces developed between contacting surfaces within the novel couplings whereby great holding power is provided frictionally. By incorporating a tapered holding pin in the novel coupling, double safety and security are provided. Although square couplings are the preferred form for practical, commercial and industrial use, the invention may be embodied in polygonal couplings for special situations.

---

The present application is a continuation-in-part of applicants' co-pending application Ser. No. 387,884, filed Aug. 6, 1964 and now abandoned.

It is well known in the art that round slip-on, set-screw fittings originated abroad, particularly for use in the agricultural field. Slip-on fittings replaced old threaded fittings which had the disadvantage of having to be threaded with dies, etc., and which were too complicated and too sensitive to foreign matter, sand etc. Generally speaking, scaffolds or similar structures were constructed with heavy round cylindrical pipe which was connected together by means of heavy round couplings. In their simplest forms, they consisted of heavy round cylindrical members of greater bore than the external diameter of the heavy round pipe. The round coupling is slipped on the end of the round pipe and only one screw is inserted in the coupling to contact the wall of the round pipe. The real holding of the horizontal round pipe is effected by a tilting action under cantilever load which causes a binding as well known in the art. Difficulty was encountered in the sale and the use of heavy European round fittings in the United States and Canada because European round pipe was oversize in relation to American and Canadian round pipe. As a result, the European round fittings were oversize and made a very loose fit on the American and Canadian round pipe. They did not fit correctly and they were on the borderline of being safe and secure. Consequently, a serious problem was involved in ensuring heavy round pipe, particularly in horizontal positions, remaining safely and securely in the round fittings or couplings when not under cantilever load. It was also found as a result of experience that, in order to provide reasonably good strength and efficiency, the round pipes had to be made of heavy material and only steel pipe could be safely used as the force of a plain set screw on any light-walled pipe would spring it and it would be insecure. Accordingly, only thick-walled steel pipe was used in the construction of round pipe structures. Another incurable factor was that in making up a structure a person skilled in the art always had to take into account that the round pipe coming out of a T fitting or elbow or the like must be securely anchored at the other end of the pipe because the round fitting could not be required to take any clockwise or anticlockwise forces as a set screw was of no assistance in holding the pipe securely in position. A further disadvantage was in structures built to ceiling heights. Such a structure, because of its weight, became somewhat top heavy and had to be carefully braced and secured to an adjoining wall to avoid a dangerous situation developing when racks were loaded. Likewise, a difficulty was experienced in moving the structure from place to place when being dismantled due to the excessive weight factor. A still further disadvantage was the excessive load on the supporting floor due to the excessive weight of the round pipe structure and the load on the shelves, etc., of the structure. Moreover, other limitations were involved in round pipe structures including the limitation that T and other fittings only had one set screw. Such structures had to be used with discretion and had to be properly supported to be safe and secure as the round fitting with only one conical-faced set screw bearing on the wall of the round pipe had a tendency to slip down under direct load at the point of the fitting placed under perpendicular pressure. The fitting was only to be depended upon for holding power when some extended leverage weight was permitted on the structural pipe member at right angles to cause it to jam or lock on the round pipe. And, an even greater problem was involved in preventing axial or rotary slipping. Since both the fitting and the pipe were round, they could slip very easily in an axial or rotary manner. When square tubing appeared on the market various attempts were made to join it. Difficulty was encountered in joining the square tubing as welding was the only popular and well-known method of making the joints. The art experienced trouble in welding thin wall square tubing owing to the liability of burning through the metal. It was found that it was impractical, if not impossible, to weld thin wall square tubing. When attempts were made, it was necessary to conduct operations in a shop as operations in the field were not very practical. Thick wall tubing was not so difficult to weld, but the tubing had to be carefully mitered and a good weld secured which required the use of skilled craftsmen. As those skilled in the art know, welding is very expensive and requires over-welding clean-up by grinding, etc. Once welded, of course, the welded structure could not be taken apart for moving or use in other situations. Other attemps to join thick wall square tubing included mechanical joining. The only possible way was to use formed plates, bore then on the tubing and finally insert nuts and bolts. Such a procedure was not found to be too satisfactory in practice. Although attempts were made to overcome the foregoing difficulties and other disadvantages, none, as far as we are aware, was entirely successful when carried into practice commercially on an industrial scale.

It has now been discovered that the present novel square, non-twisting coupling having multiple set screws in a strong diagonal rib and especially adapted for connecting thin-walled tubing has provided the art with new and improved results. The square coupling is not too expensive to manufacture, is lighter in weight than anything previously known, and is capable of giving greater safety and security to load-resisting or load-supporting structures. By using a plurality of Allen-type screws in a strong diagonol rib of the new square coupling, which are provided with cutting edges at the bottom of each screw, they are capable of cutting, digging and penetrating into the corner of mounted tubing and locking the same in the new square coupling. The plurality of Allen screws is distributed along the strong diagonal rib of the square coupling to develop a great uniform force against the mounted tubing and to develop at least 50% frictional holding power between the exterior of the square tubing and the interior of the sqaure coupling. For preventing the misplacement of the square tubing in the square coupling, an internal block or shoulder is incorporated internally at approximately the mid-section of the coupling. Due to the longer length of the novel square, non-twisting coupling, a much better fit can be developed with square tubing and a longer coupling area made available for multiple screws avoids any substantial deflection in the horizontal and also vertical joining of the structural tubular members. As the market for modern square tubing in a variety of metals and/or alloys including stainless steel is expanding continuously and the sizes and gauges of the tubing are being offered in greater variety, the novel square, non-twisting coupling possessing great utility has very broad use. The new square couplings can be rade in a variety of sizes capable of connecting modern square tubing and are practical and economical in preferable commercial sizes varying from approximately one inch O.D. to four inches or so. The markets where the novel square couplings can be used are practically without limit provided the size of the coupling and the size of the wall thickness of tubing are properly calculated for good strength to make a safe and secure load-resisting or load-supporting structure.

Summarizing, the present invention relates to load resisting structures made of thin walled, square tubing and connected with novel square, non-twisting couplings, and, more particularly to a load supporting structure constituted of vertical and horizontal tubular structural members made of thin-walled, square tubing and connected with novel square, non-twisting couplings. Specifically contemplated is the provision of a rugged, strongly-reinforced rib extending diagonally along one corner of the coupling which may include a plurality of Allen-type screws having substantial strength with a number of threads to give great holding power whereby great force is exerted against a corner of the square tubing mounted within the square coupling.

It is an object of the present invention to provide a load-resisting or a load-suporting structure comprising thin-walled, square tubing connected with square, non-twisting couplings.

Another object of the invention is to provide a load-resisting or a load-supporting structure constituted of a plurality of vertically-arranged square tubular members and a plurality of horizontall-arranged square tubular members which are safely and securely joined together by means of novel square, non-twisting couplings.

It is a further object of the invention to provide a novel square, non-twisting coupling for joining thin-walled, square tubing and having a rugged, strong diagonal rib on one corner provided with a plurality of screw holes having a sufficient number of threads to give strong holding power.

It is another object of the invention to provide a novel square, non-twisting coupling having a strong diagonal rib on one corner with a plurality of Allen-type screws provided with knurled cutting teeth at the end of each screw and adapted to cut into and penetrate the wall of the square tubing to ensure a locked joint of great safety and security.

Still another object of the invention is to provide a novel square, non-twisting coupling having a strong diagonol rib on one corner provided with a plurality of Allen-type screws capable of forcing mounted square tubing uniformly and evenly against the two opposing walls of the coupling to develop great frictional forces and great holding power between contacting surfaces.

It is also an object of the invention to provide a novel square, non-twisting coupling for joining horizontally-arranged square tubing and/or vertically-arranged square tubing and having a plurality of Allen-type screws in a strong diagonal rib as well as a tapered pin driven through holes in the square rib of the fitting holding the mounted square tubing to make a strong frictional fit and a safe and secure joint which is virtually impossible to pull apart.

Among the further objects of the present invention is the provision of a novel square, non-twisting coupling capable of connecting square tubing safely and securely without axial or rotary slipping and without sections of the tubing escaping from the coupling.

Other objects and advantages will become apparent from the following description taken in the conjunction with the accompanying drawing in which:

FIG. 7A shows a perspective view of a T embodying the principles of the present invention;

FIG. 7B is a cross section of the coupling shown in FIG. 7A taken on the line 7B—7B through one of the screw holes in the rugged, strong diagonal rib on a corner of the coupling;

FIG. 8A is similar to FIG. 7A of a modified embodiment of the invention showing a tapered pin in position in the coupling and mounted tubing;

FIG. 8B shows a sectional view taken on the line 8B—8B through the tapered pin;

FIG. 9 illustrates an enlarged sectional view of a corner of a coupling showing an Allen-type screw engaging the corner of a mounted tubing;

FIG. 10A is a cross sectional view of a coupling and associated mounted tubing in an exaggerated condition of deformation under the force exerted by the Allen-type screw in the strong diagonal rib in the corner of the coupling;

FIG. 10B is an enlarged sectional view of a corner of the coupling shown in FIG. 10A showing the cutters in the bottom oft he Allen-type screw cutting, digging and penetrating into the corner of the mounted tubing;

FIG. 11 is a perspective view of an Allen-type screw used in a screw hole in the strong diagonal rib on a corner of a coupling;

FIG. 12 shows the botom of the Allen-type screw illustrated in FIG. 11 in order to depict the cutters in an annulus near the outside of the screw for cutting, digging and penetrating into the wall of a mounted tubing;

Figure 20:
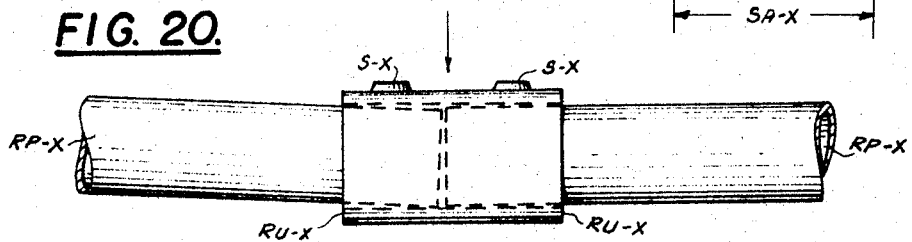
Figure 21:
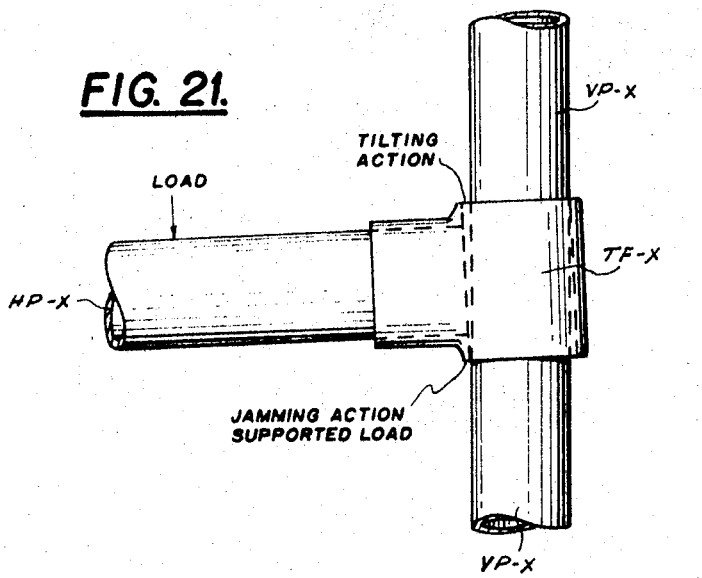

FIG. 20 is a prior round short length union joining two sections of prior round pipe showing the loose fit and the contact of a single prior conventional conical faced screw with a round pipe making it impossible to provide a secure joint between two round pipes in the prior round system; and FIG. 21 shows a prior round-T joining vertical and horizontal round pipes and illustrating the prior tilting cantilever action in the prior round system jamming the corner of the round T against the wall of the vertical pipe to provide structural strength.

Figure 1:
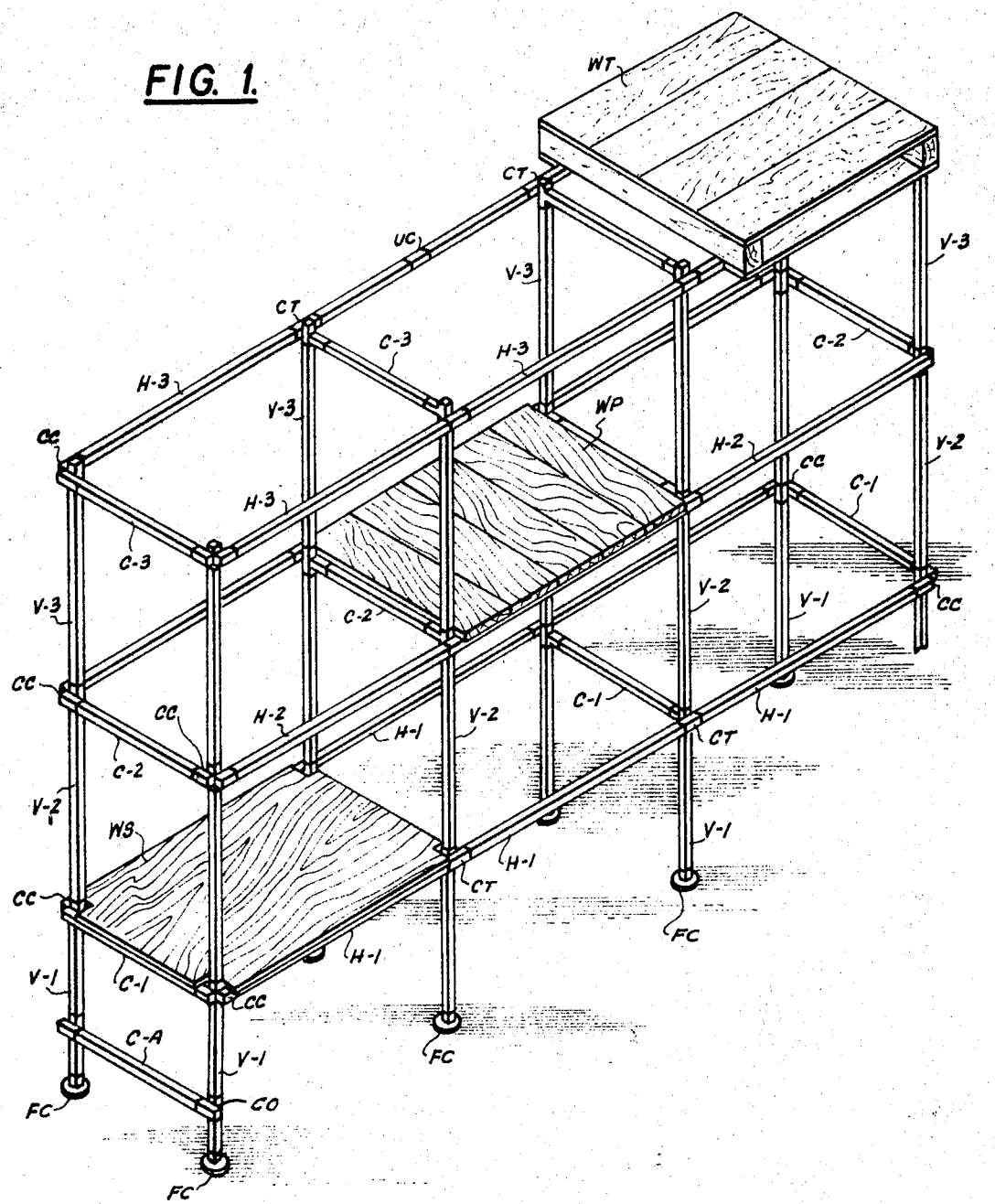
FIG. 1 is a perspective view of a load-supporting structure embodying the present invention.

The embodiment of the present invention illustrated in FIG. 1 is a storage rack. It can be constructed with as many shelves, tiers or floors as desired. In the present illustration three shelves, tiers or floors are shown for convenience of description. Similarly, three sections are shown, although any desired number may be used. In each section a shelf of selected type may be employed. For example, in the first section a wooden shelf WS made of plywood is illustrated. In the second section, wooden shelf boards or planks WP are shown whereas in the third section, a wooden pallet WT is shown. As those skilled in the art know, the shelves can be made of any desired material. For instance, metal shelf boards or plates made of stainless steel, aluminum, plain or alloy steel, brass, copper, nickel, or the like, can be selected. It is preferred to use rust-proof and corrosion-resistant metals and alloys. Those skilled in the art can select the material or metal or alloy depending upon the requirements of the situation and the nature of the goods to be stored on the shelves. In the same way, the thickness and size of the material can be selected according to the needs of any particular situation.

In FIG. 1, a load-supporting structure embodying the present invention is illustrated which is constituted of a plurality of vertical and horizontal structural members made of thin-walled, square tubing and securely connected with the novel square, non-twisting couplings. For purposes of convenience, and illustration, the various novel couplings in the different parts of the load-supporting structure have been shown generally. The detailed construction of the novel couplings is illustrated in other figures of the drawings and is described hereinafter.

Vertical tubular members are designated by the reference characters V-1, V-2 and V-3 depending upon their location from the supporting floor. These tubular members comprise thin-walled square tubing made of an appropriate metal or alloy. It is preferred to use square tubing made of a rust-proof and corrosion resistant metal or alloy such as aluminum or stainless steel. However, plain and alloy steel or malleable iron can be used provided it possesses adequate properties including high strength and provided it is protected against rusting and corroding. Generally speaking, square tubing having a 2 inch O.D. (outside diameter) and a wall thickness of approximately 0.035" is suitable for the storage rack in FIG. 1. For other conditions, smaller or larger square tubing can be used. For instance, square tubing having about 1 or 1½ inch O.D. and 0.028" wall thickness can be used where lighter loads are to be accommodated on the load-supporting structure whereas square tubing having about 3 or 4 inch O.D. or so and 0.050" or so wall thickness can be employed where heavier loads are to be supported.

Between the vertical tubular members are a plurality of horizontal tubular members H-1, H-2 and H-3 depending on whether they are on the first tier or shelf, the second tier or the third tier. The tubular members in the front and the rear of the storage rack are joined by connecting tubular members C 1, C-2 and C-3. To further strengthen the connection between the front and the rear, an auxiliary connecting tubular member CA is provided as may be seen from the left side of the storage rack.

Figure 5:
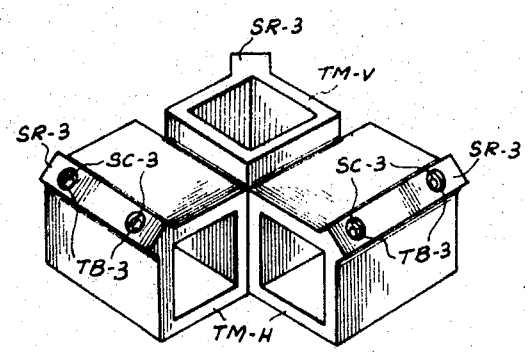
FIG. 5 is a perspective view of a corner coupling used in load-resisting or load-supporting structure.
Figure 6:
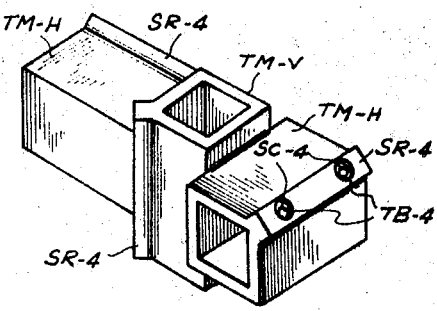
FIG. 6 depicts a perspective view of a cross-over T constructed in accordance with the present invention and adapted for use in load-resisting or load-supporting structures.

At the bottom of each vertical tubular member V-1 is a flange coupling FC which rests on the supporting floor. This floor may be cement or concrete or may be any suitable material having appropriate hardness, toughness, strength and other properties which would enable the material to sustain and support the storage rack and the load carried thereby. The detail construction of the flange coupling may be seen in FIG. 3. On each corner of the load-supporting structure, a corner coupling CC is provided. The corner coupling can connect the vertical members with the horizontal member and the connecting member. FIG. 5 shows the structural details of the corner coupling. Between the right side of the storage rack and the left side, other appropriate couplings are employed. For instance, cross-over Tee couplings CT connect horizontal tubular members with vertical tubular members and connecting tubular members. Reference may be had to FIG. 6 for further details of the cross-over coupling. To connect the auxiliary connecting member CA to the vertical members, a cross-over coupling CO is provided which is clearly shown at the left side of the storage rack. For other details, reference may be had to FIG. 4. When it is desired to join the ends of horizontal members or the like a union coupling UC is used. The rear of the top or shelf of the second section illustrates the use of the union coupling. As there may be a frequent need of such a coupling, several figures (FIGS. 2A, 2B and 2C) illustrate its construction and use.

Figure 2A:
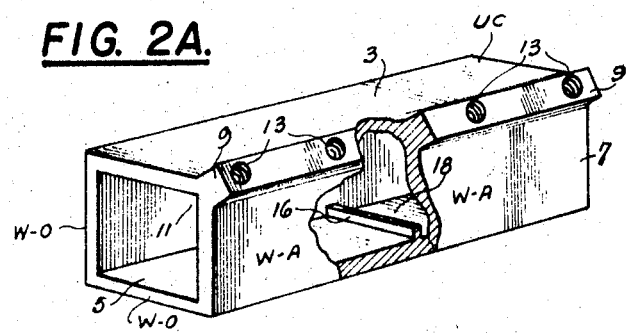
FIG. 2A depicts a perspective view of a novel square, non-twisting coupling constructed in accordance with the present invention and shown with parts broken away and others in section for purposes of clarity.
Figure 2C:
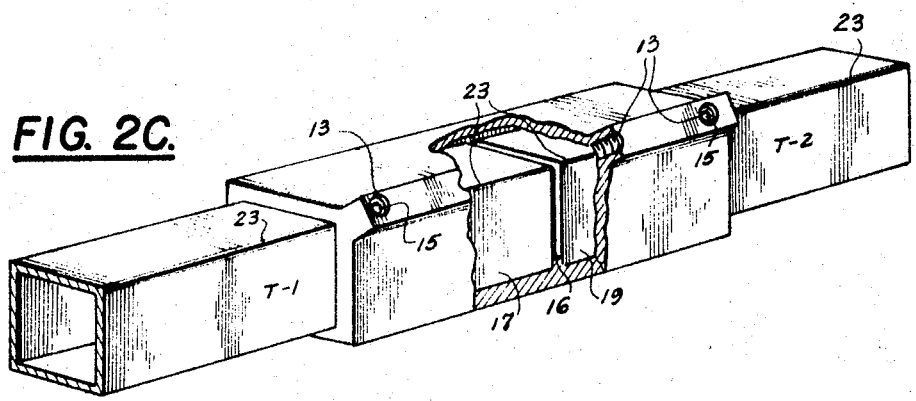
FIG. 2C depicts a perspective view of a novel square, non-twisting coupling with parts broken away and with parts in section to illustrate the present invention with tubing mounted in the coupling.
Figure 2B:
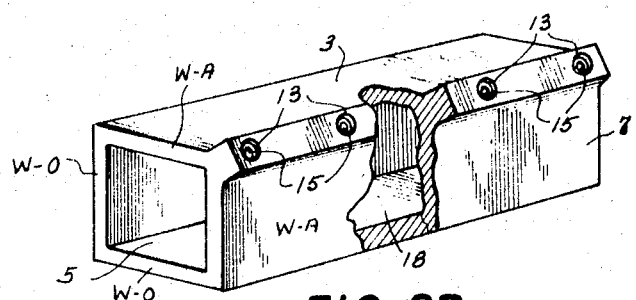
FIG. 2B is similar to FIG. 2A of a modified embodiment of the present invention.

The present invention can be embodied in a great variety of couplings. Different embodiments are illustrated in the drawings. Thus, FIGS. 2A, 2B and 2C illustrate a union coupling embodying the principles of the invention. A union coupling UC comprises an elongated tubular connecting member 3 which is longer than conventional unions. For the purpose of connecting square tubing having about 1 or 2 inch O.D., a length of about 4 to 6 inches has been found to give satisfactory service. The ends of the tubular members terminate in open ports 5 and 7 for receiving the ends of square tubing mounted within the union coupling. The I.D. (inside diameter) of the union coupling is a little larger than the O.D. (outside diameter) of the square tubing and the latter can be slipped or slid into the former thereby forming a convenient sliding joint as may be seen in FIG. 2C. A rugged, strongly reinforced ridge or flange 9 extends diagonally from an exterior corner 11 of the union coupling. The rugged reinforced ridge is preferably formed integral with adjacent walls W-A of the tubular member 3. A convenient manner of effecting such construction is by casting the union coupling as an integral unit as well understood by those skilled in the art. It is preferred to extend the rugged ridge 9 longitudinally along the entire corner as shown in FIG. 2A thereby imparting great strength to the ridge. Generally speaking, the width and depth of the ridge should be several times the thickness of the wall of the union coupling. For example, a union coupling having about a 1 inch I.D. with a wall thickness of about one eighth (⅛) of an inch is preferably provided with a rugged reinforced ridge having a width of about three eighths (⅜) of an inch and a depth of about the same amount. Such a rugged ridge has a plurality of threaded bores 13 incorporated therein. It is preferred to have an even number of bores, such as 4 bores shown in the embodiments in FIGS. 2A, 2B and 2C. With larger sizes of union couplings, 6 or 8 or 10, or so, bores can be used. In each bore, an Allen-type screw 15 is provided. As is well known, a key wrench with an appropriately shaped end, such as a hexagonal end, can be employed to insert or withdraw a screw from a bore. By spacing the screws 15 suitable distances from each other, they can apply a substantially uniform pressure or force to the corner of the mounted tubing as may be seen in FIG. 2C. It has been found that at least two screws must be used in connection with each end of a tubing. For larger size tubing, more screws must be used. Thus, for a 2 inch O.D. tubing at least 3 screws should preferably be used, a 3 inch O.D. tubing at least 4 screws should preferably be used, and a 4 inch O.D. tubing at least 6 screws should preferably be used. In this manner, a total of at least 6 screws is used in a 2 inch union coupling, at least 8 screws in a 3 inch coupling, and at least 12 screws in a 4 inch coupling. In other words, the present invention provides a novel multi-screw, union coupling.

For the purpose of properly aligning the tubing in the novel union coupling, a shoulder, block or stop member 16 projects internally and perpendicularly from an interior wall 18 of the tubular member. FIG. 2C illustrates how the ends of two pieces of tubing T-1 and T-2 may be connected with the novel union coupling. The ends 17 and 19 of tubing T-1 and T-2 are properly positioned within the tubular member 3 by shoulder 16 and are located at approximately the middle or center of the union coupling. In other words, the ends of the tubing are equidistant from the entrances to ports 5 and 7. When the screws are tightened to engage an exterior corner 23 of tubing T-1 and T-2, uniform pressure and force can be applied and a safe and secure connection can be made.

In the event that the lengths of tubing are to pass into a novel union coupling without terminating at the midpoint, a stop member, such as a shoulder 16, is omitted. The interior wall 18 of the coupling is smooth so that tubing can be passed freely into the coupling without stopping at a fixed position at the middle or center of the coupling. The screws can be inserted in the usual manner in order to fasten the tubing safely and securely.

The novel square, non-twisting coupling is especially adapted for manufacturing by casting. FIG. 3 to FIG. 8A illustrate different types of couplings which can be cast and which can embody the present invention. A variety of metals and alloys can be utilized in making the novel cast couplings. For instance, aluminum, brass, bronze, cadmium, nickel and nickel-copper alloys, steel, stainless steel and zinc are suitable for casting and especially for die casting and precision casting. All of the structural parts of the novel coupling can be cast as an integral unit possessing strength and other desirable properties. The selection of the metal and alloy can be made by those skilled in the art depending upon the conditions of use and the purposes of the load-resisting or load-supporting structure.

Figure 3:
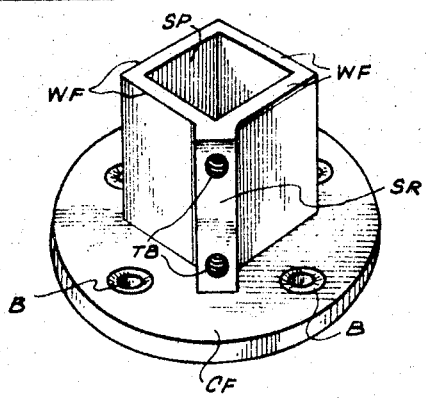
FIG. 3 shows a flange embodying the principle of the present invention and being adapted for use in a load-resisting or a load-supporting structure for anchoring it to the floor, wall or ceiling.

In FIG. 3, the novel flange coupling comprises four walls WF forming a square and having a base made of a circular flange CF. This flange is provided with a plurality of bores or holes B for screws or bolts for fastening the couplings to a supporting floor, wall or ceiling. Along one corner where two walls come together, a rugged, strongly-reinforced ridge SR is located. It is preferred to have the strong ridge SR extending along the entire corner of the walls and merging into the circular flange. By so constructing the ridge, a strong coupling is produced.

The ridge is provided with a plurality of threaded bores TB. In the present embodiment, two threaded bores are illustrated for the reception of Allen-type screws. The end of square tubing can be mounted within the square port SP. By inserting the screws, they can be screwed into the corner of the tubing and can make a safe and secure connection. When the end of the screw is provided with cutting teeth, the screw can cut, dig and penetrate into the surface of the corner of the tubing and, in effect, form a locking connection. By referring to FIG. 1, it will be seen that the bottom of each vertical tubular member is mounted in a novel square, non-twisting flange coupling.

Figure 4:
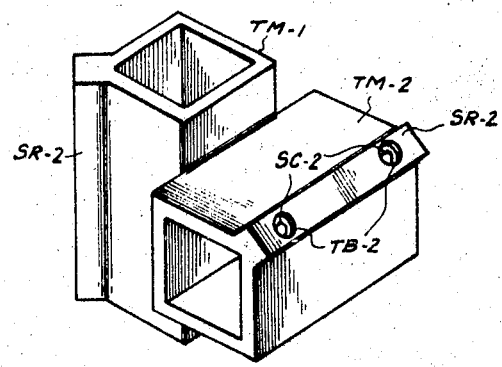
FIG. 4 illustrates a cross-over coupling embodying the present invention and capable of use in a load-resisting or a load-supporting structure.

In FIG. 4, a novel cross-over coupling is illustrated. One tubular member TM-1 is arranged at right angles to a second tubular member TM-2, thus providing a cross-over arrangement. The tubular members are preferably cast in such shapes as to be able to have square tubing mounted in each one but perpendicular to each other. At an accessible corner of each tubular member, a rugged, strongly reinforced ridge SR-2 extends diagonally therefrom. Incorporated in each ridge is a plurality of threaded bores TB-2. In the present illustration, two are shown for the reception of Allen-type screws SC-2. It is preferred to have a hexagonal hole or inset in the top of each screw which will fit the hexagonal end of a conventional key wrench well known to the art. By inserting the hexagonal end in the hexagonal hole or inset, the screw can be inserted or screwed into the threaded bore or can be withdrawn therefrom. In this manner, the tubing can be locked safely and securely in position. In the event that it is desired, a shoulder or stop member can be incorporated in the middle or center of each tubular member. When the tubing is to pass through as in the by-pass system, the shoulder is omitted.

The novel square, non-twisting coupling shown in FIG. 5 is a corner coupling. As may be clearly seen, a vertical tubular member TM-V is provided with two horizontal tubular members TM-H terminating at right angles to each other. The three tubular members are made together and are preferably cast as an integral unit. On an accessible corner of each tubular member is located a rugged, strongly reinforced ridge SR-3. Within each strong ridge, at least two threaded bores TB-3 are incorporated. In each bore is an Allen-type screw SC-3. When a by-pass system of tubing is used, the interior of each tubular member is smooth to permit square tubing to pass freely through. However, when the ends of adjoining tubes are to be accommodated, a shoulder or stop member is provided on the interior of the tubular member at about the middle or center. When the square tubing is mounted in the novel square corner coupling, a key wrench can turn each screw in its threaded bore until it is locked securely in the corner of the tubing and a safe structure is made.

In FIG. 6, a novel cross-over T coupling is illustrated. It is also preferred to make all parts of this coupling as an integral unit as in a single unitary casting. A vertical tubular member TM-V has one horizontal tubular member TM-H located on one wall and a second horizontal member TM-H on a second wall opposite the first one. A rugged, strongly-reinforced ridge SR-4 is located on an accessible corner of each tubular member. At least two Allen-type screws SC-4 are provided in threaded bores TB-4 incorporated in the strong ridge SR-4.

As the embodiment shown in FIG. 6 is intended for a by-pass system, no shoulder or stop member is positioned at the middle or center of each tubular member. In the event the ends of adjoining tubing are to be accommodated within each tubular member, a shoulder or stop member is cast on the interior wall at about the middle or center. In this case, at least two additional threaded bores and associated Allen-type screws must be provided in each strong ridge for safely and securely locking the mounted tubing in position. The novel cross-over T coupling as well as the other novel couplings can be seen in the various locations in the load-supporting structure illustrated in FIG. 1.

In FIGS. 7A to 8B, a T coupling embodying the present invention is illustrated. Referring to FIG. 7A, a novel T coupling is shown with the vertical unit VU depicted in an upright position. Side units SU extend horizontally and are perpendicularly located with respect to the vertical unit. The ends of tubing extend into said units as may be clearly seen from FIG. 7A and about an internal shoulder or stop member in about the mid-point in order to properly position tubing within each unit. To lock the tubing in position, Allen-type screws SC–7, dig and penetrate into the corner of the tubing. This may be seen in FIG. 7B, for example, where the end of the screw located in a threaded bore TB–7 is in contact with a corner of tubing and is locked therein. The threaded bores and the screws are incorporated in a strong rib or ridge SR–7 located on one or more corners of the units.

A modified embodiment of the present invention is illustrated in FIG. 8A which is similar to the embodiment shown in FIG. 7A except a special tapered safety pin is combined with the new coupling. The novel coupling is shown with the vertical unit VU extended sidewise from the side units SU. On one or more accessible corners of each unit is a strong ridge SR–8. In each strong ridge is a plurality of threaded bores TB–8 and associated screws SC–8. For extra safety in load-resisting or load-supporting structures carrying extra heavy loads, a special tapered safety pin P–8 is provided. It is preferred to make this pin of a tough and strong metal or alloy with a high surface hardness like stainless steel or alloy steel of suitable composition. Pre-formed holes or bores are provided in the strong ridge and the tubing mounted within the coupling. When the load-resisting or load-supporting structure is being erected, the tapered safety pin is driven securely in final locking position as may be seen in FIG. 8B. After the tapered safety pins are all driven securely in position, the Allen-type screws with cutting teeth at their ends are inserted in the threaded bores and are screwed in their final locking position. In this manner, the novel couplings are each double locked in a safe and secure position. The invention thus ensures great safety in the new load-resisting or load-supporting structure.

An appropriate locking screw is depicted in FIGS. 11 and 12 which can be satisfactorily used as part of the novel coupling embodying the present invention. The locking screw has a plurality of threads TS on its external cylindrical surface. The over-all length L of the screw and the diameter D are selected to provide the proper strength. In the head of the screw, a hexagonal hole or inset is incorporated for fitting and mating with a hexagonal key wrench of conventional character well known to those skilled in the art. An annulus at the bottom end of the screw closely adjacent to the external cylindrical surface is a cutter comprising a plurality of knurled cutting teeth CT which may be clearly seen in FIG. 12. Within the annulus at the bottom of the screw is a concave cavity CV. By providing this construction, the annular cutter can effectively cut, dig and penetrate into the corner of tubing when the screw is screwed into a threaded bore with the aid of a conventional hexagonal key wrench. Suitable diameters of the screws having been found to vary from about $3/16''$ or $1/4''$ to about $7/16''$ or $1/2''$ or so depending upon the size of the tubing and the load to be supported and/or resisted. Likewise, the length can vary from about $7/16''$ or $1/2''$ up to about $3/4''$ to $1''$ or so. Similarly, the size and number of threads can vary. For large diameter Allen screws, coarse threads will be used in accordance with standard practice whereas for small diameter screws, fine threads will be used. With some screws, especially with coarse threads, a half dozen threads or so can be used whereas with other screws, especially with fine threads, 8, 10 or 12 or so threads can be used. The combination of length, diameter and number of threads can be selected to provide an adequate force in the threaded bore and against the corner of tubing to enable the screw to bind, deflect, deform and/or lock the tubing within the novel coupling in a safe and secure manner.

In FIG. 9, a corner of the novel coupling and mounted tubing of FIG. 7B is illustrated in an enlarged and exaggerated scale for purposes of clarity. The screw SC–7 is shown in the threaded bore TB–7 with its bottom end and cutter just making contact with the corner of tubing. FIG. 10B shows the screw when it is in its locked position after it has cut and dug into the corner of tubing, has indented and penetrated the surface of the wall thereof, and has bound, deflected and/or deformed the tubing.

The final position of the tubing when it is locked within the novel coupling is illustrated in FIG. 10A. The tubing is shown in a diagrammatic manner for purposes of illustration. As the screws are forced against the corner of tubing, diagonal pressure is brought to bear on the tubing and it is forced away from adjacent walls WA and towards the opposing walls WO of the coupling. The arrows diagrammatically illustrate the direction in which the tubing is being forced. When the screw has been adjusted to its final locked position, the exterior surfaces of the walls of the tubing are brought into frictional engagement with the interior surfaces of the opposing or opposite walls WO. In this manner, enormous frictional holding power is developed. In other words, at least 50% of the total frictional holding power is developed between the exterior of the square tubing and the interior of the square coupling. The longer the coupling, the greater the frictional holding power. Similarly, the wider the coupling the greater the frictional holding power. The length and the width determines the area where frictional holding power can be developed as well understood in the art. Since the surfaces of at least two walls The length and the width determines the area where frictional holding power can be developed as well understood in the art. Since the surfaces of at least two walls will be involved, at least 50% of the frictional holding power of all walls is developed. This frictional holding power is so great that safe and secure couplings are provided as well as safe and secure load-resisting or load-supporting structures are ensured as well as an anti-vibrational factor.

For the purpose of giving those skilled in the art a better understanding of the invention and/or a better appreciation of the advantages of the invention, the following illustrative examples are given.

Example I

Figure 13:
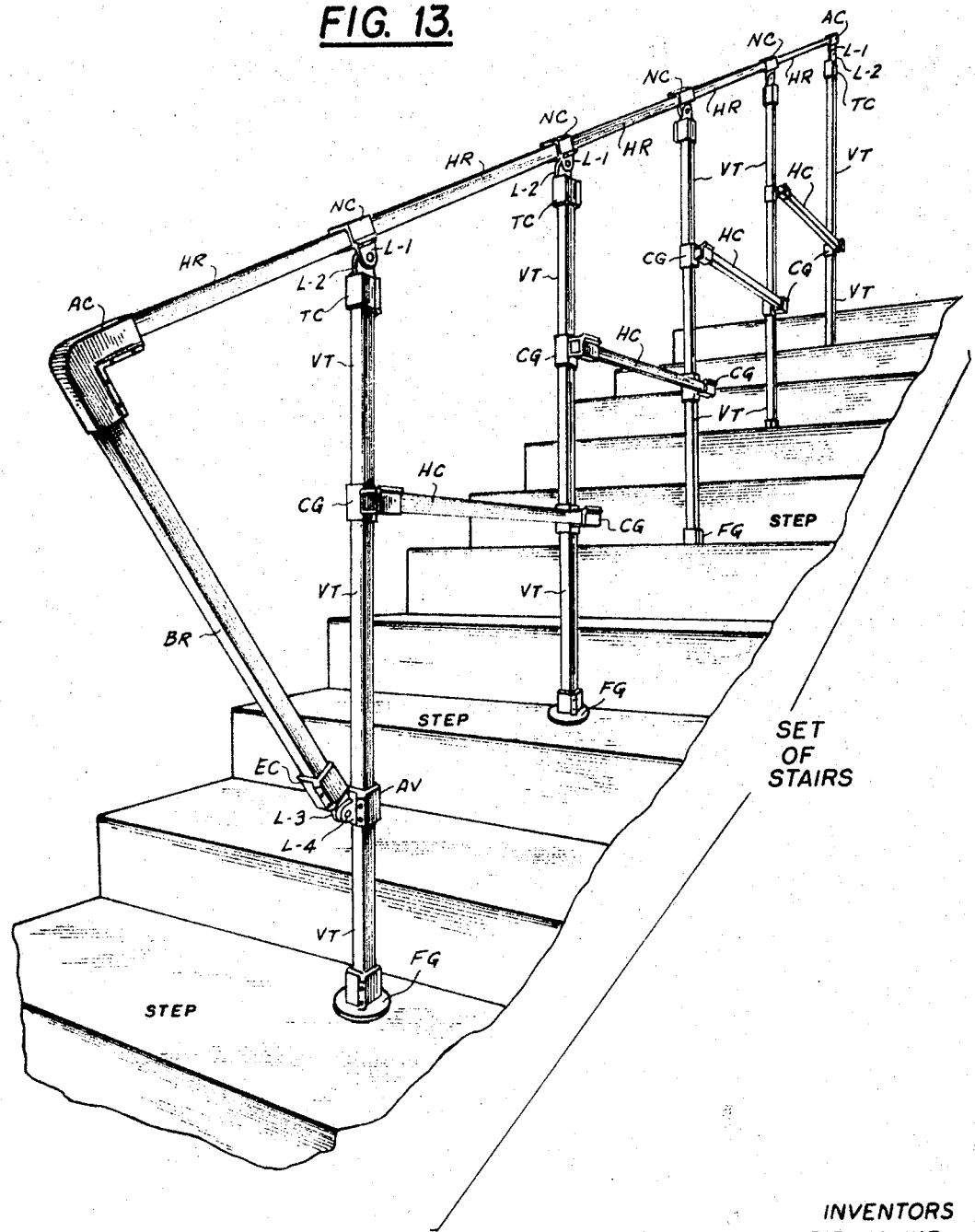
FIG. 13 depicts a perspective view of a railing embodying the present invention and adapted for erection on stairs.

In FIG. 13, a load-resisting structure in the form of a railing for a set of stairs is illustrated. The inclined sections of the hand-railing HR are connected together by means of a plurality of novel couplings NC. Such couplings can be of the by-pass type without an internal shoulder or stop member. On the other hand, if short lengths of square tubing are used between the couplings, then a shoulder or stop member is provided on the interior of each coupling at about a mid-point. The square tubing is safely and securely locked in place by using Allen-type screws with cutters at their bottom ends in a strong ridge associated with each coupling. Underneath each coupling is a lug L–1 which projects downwardly and which cooperates with a lug L–2 projecting upwardly from a top coupling TC at the head of each vertical tubular member VT. This tubular member can be made in one length extending from the top to the bottom. For special cases, the square tubing can extend from coupling to coupling, if desired.

At the bottom of each vertical tubular member is a flange coupling FG. Each flange coupling is provided with a plurality of conventional bolts (not shown) for fastening the coupling to a step of the stairs. Each flange coupling is safely and securely locked to the square tubing by means of a plurality of Allen-type screws in a strong ridge. The operation and function of the Allen-type screws have been described heretofore in detail and will not be repeated. This applies to all couplings used in the railing.

Between the vertical tubular members are located horizontal tubular connecting members HC. At each end of each horizontal connecting member is a cross-over coupling CG which is safely and securely fastened to the vertical member as well as the horizontal member. The cross-over couplings are locked in position by means of the Allen-type screws mounted in threaded bores in strong ridges as explained heretofore.

At each end of the inclined hand railing, an angular connecting member AC is located. This member is locked to the associated square tubing in the usual manner by means of a plurality of Allen-type screws. Extending from the front angular connecting member is a brace BR. The lower end of the brace is fastened to the vertical member with the aid of couplings. An end coupling EC is safely and securely locked to the end of the brace and is bolted to an auxiliary vertical coupling AV by means of lug L-3 and lug L-4. Since the end coupling EC is provided with a rugged, strongly reinforced ridge and associated screws and since the construction and function of the ridge and screws have been described heretofore in connection with other couplings, they will not be repeated.

When the square tubing and the novel couplings are made of a suitable metal or alloy, such as stainless steel, a strong and satisfactory load-resisting structure is produced. Depending upon the size and the set of stairs and the conditions of service, tubing having an O.D. of about one inch or one and one-half inches to about two inches or so will be found to be satisfactory. Stainless steel is very appropriate for use in railings as it possesses high strength and other desirable properties and is rust-proof and corrosion resistant. Square tubing as well as the novel square, non-twisting couplings can be made of stainless steel.

Example II

Figure 14:
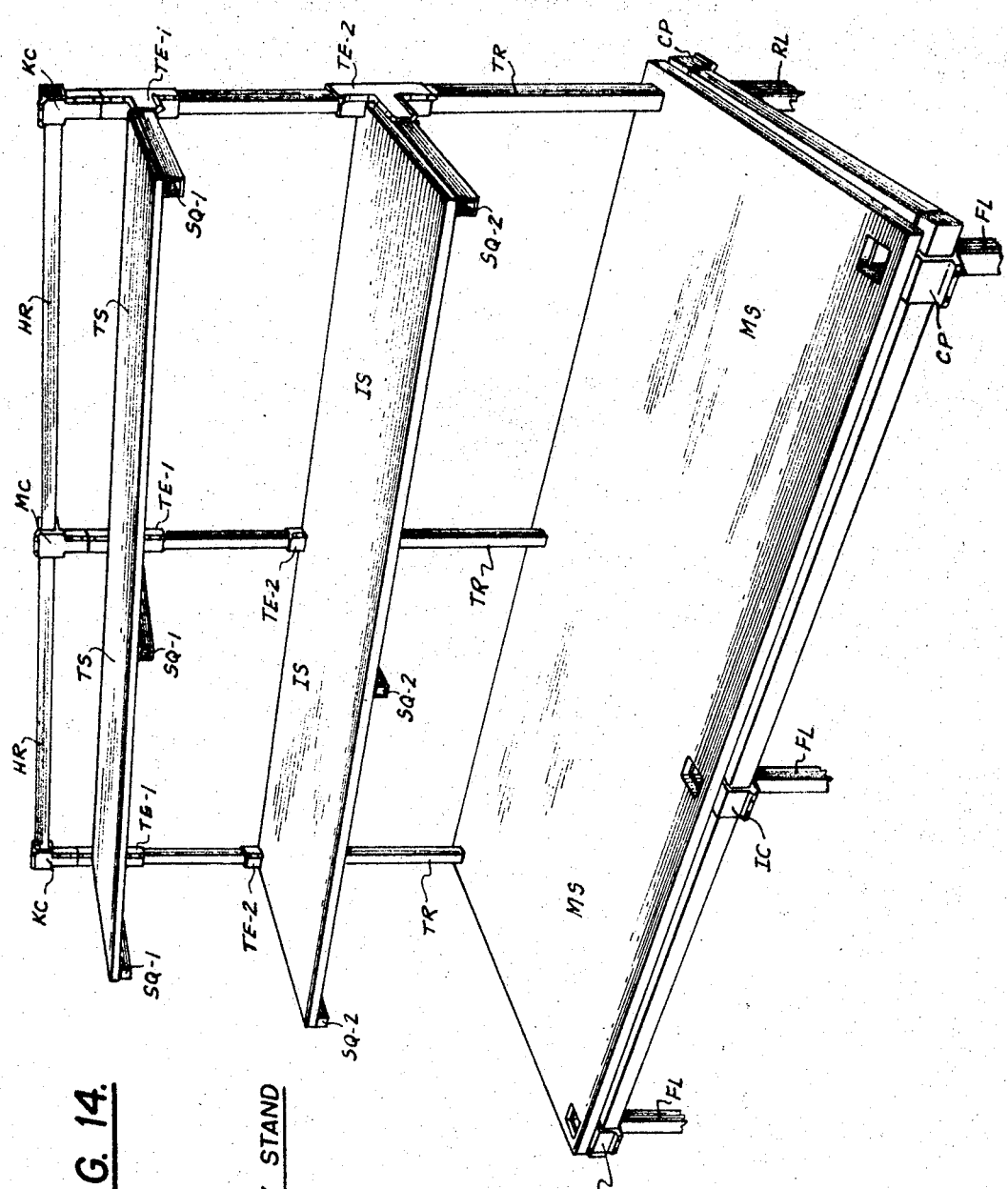
FIG. 14 illustrates a display stand constructed in accordance with the present invention.

A display stand embodying the present invention is shown in FIG. 14 and is provided with a main shelf MS, an intermediate shelf IS and a top shelf TS. Supporting the main shelf is a rectangular frame made of square tubing and novel square, non-twisting couplings. The frame is mounted on three front legs FL and three rear legs RL and has a corner coupling CP at each of its four corners. At the mid-point of the front and rear of the frame, an intermediate coupling IC is positioned. The corner couplings may have a general structure like the one illustrated in FIG. 5 and the intermediate coupling can be generally like the one illustrated in FIG. 6. Although the main shelf may be made of any suitable material, it is preferred to make it of plywood or a metal like aluminum or stainless steel with suitable strength. The intermediate and the top shelves can be made of the same material.

Projecting upwardly in the rear of the display stand are three vertical tubular members TR. Connecting the top of these three vertical members are two horizontal top members HR. At each of the corners, a corner coupling KC safely and securely joins the vertical and the horizontal members together whereas at the mid-point, a middle coupling MC is used. Below the top horizontal members, a large T coupling TE-1 is located on each vertical member. This T coupling may be like the one shown in FIG. 7A. Extending from the perpendicular arm of each T coupling is a section of square tubing SQ. This tubing is safely and securely locked in the T coupling by a plurality of Allen-type screws. As may be seen from FIG. 14, each tubing section SQ-1 acts like a cantilever beam and the three sections support the top shelf TS.

The intermediate shelf IS is supported in a similar manner. A large T coupling TE-2 is positioned in each of the three vertical members TR approximately midway between the said shelf and the top shelf. Projection outwardly in a cantilever manner from each T coupling TE-2 is a section of square tubing SQ-2. The three cantilever sections act as the support for the intermediate shelf. In other words, the square tubing and the novel square, non-twisting couplings function like a load-supporting structure just like the square tubing and the square couplings function in other parts of the display stand. The latter can be considered as an overall load-supporting structure embodying the present invention.

Figure 15:
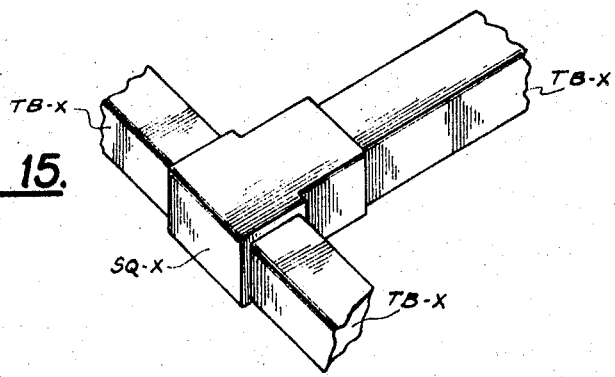
FIG. 15 is a fragmentary perspective view of a square coupling embodying the present invention and showing the impossibility of rotation due to the square shape.

In FIG. 15, a perspective view of a novel T coupling is shown diagrammatically and in a fragmentary manner to illustrate the non-twisting character of the coupling. As may be clearly seen in FIG. 15, the novel square T coupling SQ-X makes a connecting joint with tubing TB-X and, in effect, locates itself. In the by-pass system, the tubing slides through the novel coupling and makes snug contact with the coupling's interior. When cut sections of tubing are used, their ends abut an internal shoulder or stop member within the coupling as fully described hereinbefore. Due to the square tubing fitting snugly within the square coupling, it is impossible to twist or rotate or even turn it. The novel coupling provides a connection with square tubing which has high structural strength. Rotation or rotary movement of square tubing within the novel coupling is not possible due to the square shape of the square coupling and the mounted square tubing.

Figure 16:
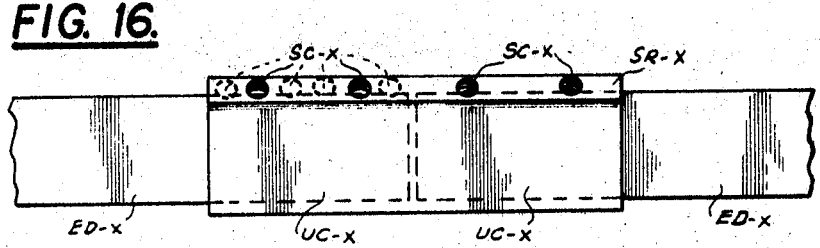
FIG. 16 shows a perspective view of the novel coupling having an extra length to provide a more precise fit and having four Allen-type screws to make a joint between two sections of square tubing very rigid and very secure.

A novel union coupling UC-X is shown in FIG. 16 with the ends ED-X of pipe extending therefrom. A shoulder or stop member is provided within the union coupling to properly position the tubing. By having the union coupling extra long, a more precise fit and a better joint is made. When extremely heavy loads are to be carried, extra screws SC-X may be used as diagrammatically illustrated on the left side of the strong ridge SR-X. In this manner, not only is a rigid and strong joint made but a safe and secure connection is likewise ensured.

Figure 17:
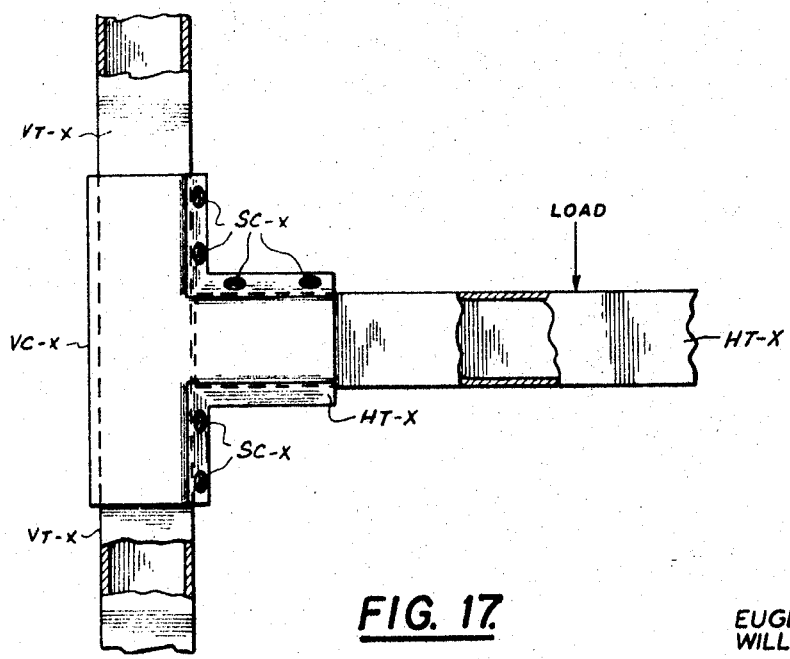
FIG. 17 is a fragmentary perspective view illustrating tubing mounted in a T and showing the self-aligning feature of the novel square couplings.

FIG. 17 is a perspective view of a novel T coupling VC-X in a vertical position. Tubing VT-X extends through the vertical unit or branch of the coupling. From the horizontal unit or branch of the coupling, a section of tubing HT-X extends outward horizontally. Depending on the load to be carried, an appropriate number of screws SC-X can be incorporated in a strong ridge associated with each unit or branch of the coupling. It is to be emphasized that at least two Allen screws are always used. As the novel square coupling is self-aligning and has large contact areas with the mounted or enclosed tubing, load-resisting or load-supporting structures can be constructed more precisely. Likewise, loading on the horizontal square tubular members will not distort the structure.

Figure 18:
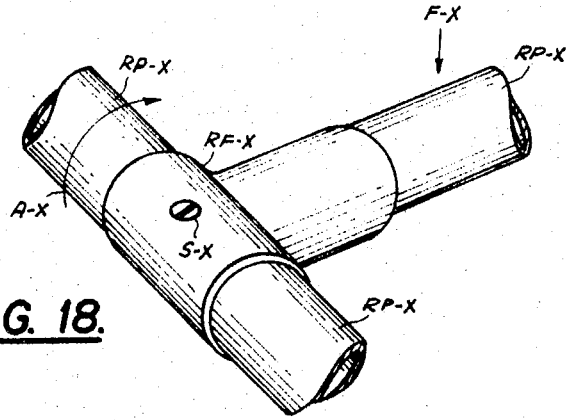
FIG. 18 depicts a perspective view of a prior round fitting with fragments of prior round pipe extending therefrom and showing axial or rotary slipping.

In FIG. 18, a prior round joint or connection is illustrated for purposes of comparison. A round fitting RF-X holds round pipe RP-X. When a force F-X is exerted by a load on a round pipe extending horizontally, it causes rotation or axial or rotary movement around the round pipe connected to the other part of the round fitting in a rotary manner as indicated by the arrow A-X. The round fitting is held in place solely by a single screw S-X and the small frictional forces developed by the single screw. As a result, structures constructed with prior round fittings have a tendency to sway or lean because of the rotation, turning or twisting of the pipe within the fitting.

Figure 19:
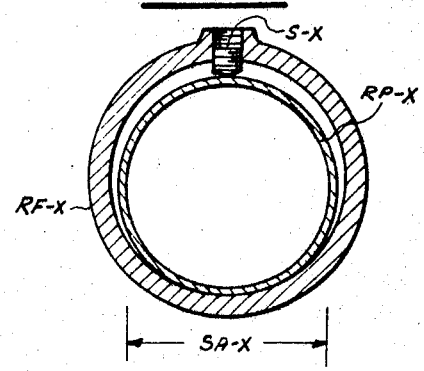
FIG. 19 illustrates a sectional view of a prior round fitting with a single prior conventional conical faced screw contacting the wall of the prior round pipe.

The weakness of the prior round fitting is clearly illustrated by FIG. 19 which is a diagrammatic sectional view through a round fitting RF-X. The round pipe RP-X within the fitting is only held by a single screw S-X. Due to the pressure of the single screw on the round pipe, it is only brought into contact with the round fitting through a limited or very small bearing area or surface SA-X. Accordingly, only limited frictional forces are obtainable on a very small internal area or surface which is directly opposite the old single set screw as well known by those skilled in the art.

FIG. 20 shows a prior round union fitting RU-X holding the ends of round pipe RP-X. A single set screw S-X holds the end of each piece of pipe. When a vertical load is applied as indicated by the arrow in FIG. 20, an insecure union or connection is effected as may be seen by the deflection of the two pipes. Due to the loose fit and the restriction of a single set screw per round pipe, it is practically impossible to provide a safe and secure structure.

A prior round pipe structure is shown in FIG. 21 with a round pipe VP–X in a horizontal position. Joining the two round pipes is a prior round T fitting TF–X. When a vertical load is applied to the horizontal round pipe as indicated by the arrow, a tilting, sagging action occurs. The round fitting is tilted on the vertical round pipe. The tilting, sagging action is indicated by the space at the left side of the top of the round fitting whereas the jamming action is indicated at the left side of the bottom of the fitting. It was therefore well understood by those skilled in the art that the prior round system with round pipe and round fittings depended on the tilting, sagging action for structural strength and the load on the horizontal pipe had to be carried by the jamming action between the bottom of the round fitting and the vertical pipe.

Generally speaking, the present invention contemplates a high strength structure. Tests have shown that structures constituted of thin-walled square tubing connected with the novel square, non-twisting coupling are safe and secure. It has likewise been shown by tests that square tubing has greater strength when acting as a beam or a column than a round pipe having the same approximate wall thickness. Thus, comparative tests were made with square tubing with 1″ O.D. and 10 gauge wall thickness and also with Schedule 40 steel round pipe with 1″ O.D. when acting as a horizontal member. In other words, the horizontal member acted as a horizontal beam. The load applied was approximately 2,000 pounds and the comparative tests showed a seven to one ratio in favor of the square tubing. The span was about two feet. The square tubing only had a deflection of approximately ⅛″ whereas the round pipe had a deflection of approximately 15/16″. Other comparative tests were made when the square tubing and the round pipe acted as a vertical member, i.e., as a vertical column. The load applied to the vertical member was approximately 13,000 pounds. The comparative tests showed a seven to one ratio in favor of the square tubing. The height of the vertical column was about five feet high. The square tubing only had a deflection of about ⅛″ whereas the round pipe had a deflection of approximately 15/16″.

It is to be observed that the present invention provides a novel square, non-twisting coupling for connecting multi-faceted structural members. The novel coupling comprises a tubular connecting member of polygonal cross section having at least two open ends. Each end is adapted to receive a structural member. A longitudinally-extending rib, flange or ridge is located on an exterior corner of the coupling adjacent each open end. Means are provided to extend through the rib, flange or ridge and to engage a corner of an associated structural member thereby effecting a high friction binding action between the interior surface of the coupling and the exterior surfaces of the structural members.

Furthermore, the invention provides a novel square, non-twisting coupling which is capable of assuming practically any polygonal shape. The polygonal shape may involve three or more sides. However, the preferred and most practical polygonal shape has a square or rectangular cross section. Such a shape is preferable for the sake of simplicity and ease of construction. The use of the novel coupling having a polygonal cross section prevents axial failure by slipping or turning of the connected structural members relative to the coupling. The screws or other fastening means safely, firmly, and fixedly secure the sections or portions of the structural members located within the coupling and likewise prevent longitudinal failure by slipping or turning of the sections or portions relative to the coupling. By virtue of the location of the longitudinally-extending rib, flange or ridge adjacent to each corner of the coupling, a high friction binding effect will be brought about between the contacting surfaces of the coupling and the structural members. This novel arrangement prevents the possible collapse or failure of the structure due to axial and/or longitudinal failure by slipping or turning Moreover, the invention provides a novel square, non-twisting coupling for connecting multi-faceted structural member which comprises a tubular connecting member of polygonal cross section with at least two open ends or ports in the connecting member adapted to receive a structural member. A longitudinally-extending rib, flange, or ridge is located on an exterior corner of the novel coupling and preferably extends not only adjacent each open end, but along the entire corner. Allen-type screws or other appropriate fastening means extend through the rib, flange or ridge and are adapted to engage a corner of an associated structural member thereby effecting a locking action between the interior surfaces of the coupling and the exterior surfaces of the structural members. The rib, flange or ridge includes deeply threaded bores for receiving threaded screws for engaging, binding and/or locking the corner of the associated structural members. The threaded screws of the Allen key or wrench type are preferably provided wiith self-boring or cutting ends for boring, cutting and digging into the corner of an associated structural member and for penetrating and indenting the wall of the structural member to provide a safe and securely locked or fastened joint.

The present invention contemplates the provision of a novel square, non-twisting coupling which can be incorporated in various embodiments. Although the invention has been described and illustrated in connection with certain illustrative embodiments, many other forms can be made and used and such forms include elbow couplings, side outlet elbows, T and cross-over couplings, a four socket cross and other standard couplings well known to the art. The rib, flange or ridge preferably extends along the entire corner of a coupling, but it can constitute a selected portion of a corner. It must be rugged and must provide deeply threaded bores with strong holding power to enable the screws to apply effective and even pressure against the corner of a structural member in order to effect high frictional resistance between the interior surfaces of the coupling and the exterior surfaces of the structural member. Such high frictional resistance ensures stability and safety of a load-supporting structure.

It is to be noted that the present invention is not to be confused with prior thick-walled, round fittings or connectors which have been placed on the market under various trade names. Such round fittings could have defects including the dangerous tendency to slip axially or in a rotary manner. The British Patent No. 677,347 to Hollaender and U.S. Patent No. 2,117,798 to Gascoigne et al. exemplified such round fittings. Other fittings and connectors were used or were attempted, particularly in non-analogous arts. For example, in the electrical art, electrical connectors were employed to protect electrical conduit systems. Such connectors did not possess high strength and were not subject to loads and stresses as they were usually buried in cement, concrete and the like of floors, walls, ceilings, etc. Electrical connectors of the foregoing type were exempliefid by patents, such as U.S. Patents Nos. 1,782,779, 1,818,389 and 1,831,856 to Fullman. Other devices included mechanical connectors where the fitting merely joined two members mechanically. Such mechanical connectors include those used in water hydrants where the length of the rods were adjusted by the connectors. U.S. Patent No. 2,866,658 to Cummings exemplified a water hydrant and U.S. Patent No. 1,386,946 to Quinn exemplified a floor socket. All of these prior devices, fittings, connectors and the like have nothing to do with the novel square, non-twisting coupling embodying the present invention for joining thin-walled, square tubing in load-supporting and/or load-resisting structures. In connection with the prior patents, it is to be noted that they are structurally different from the present invention, that they are functionally different from the functions of the present invention, that they could not produce the new results of the present invention, and that they would be inoperative for the purposes of the present invention. It is likewise to be noted that these prior patents were not confronted with the problem involved in the present invention, that these prior patents did not provide a solution to the problem involved in the present invention, that these prior patents did not disclose or even suggest the inventive concept of the present invention, that these prior patents did not disclose or even suggest the new teachings involved in the present invention, and that these prior patents did not disclose or even suggest the novel combination involved in the present invention, which utilizes standard size tubing and not conduit.

Although the present invention has been described in conjunction with the preferred embodiments, it is to be understood that modifications and variations may be resorted to without departing from the spirit and scope of the invention, as those skilled in the art will readily understand. For instance, metals and alloys are the preferred materials for the novel couplings and the square tubing, but other suitable materials, such as wood and fibrous products as well as plastic and synthetic products having appropriate properties may be used. Likewise, thin-walled tubing is preferred, but the dimension of the wall may be increased in order to sustain the load and/or to withstand the stress to which it is subjected in the load-supporting or load-resisting structure. In special cases, the polygonal tubing may have a heavy wall or may be solid. Various load-supporting and/or load-resisting structures may embody the present invention and may use for the novel square, non-twisting couplings including, for example, platforms, mezzanines and cat walks, drum racks, tailpipe and muffler racks, worktable frames, bar and pipe racks, tire racks, pallet and skid racks, storage racks, small buildings and the like. Such modifications and variations are considered to be within the purview and scope of the invention.

We claim:

1. In a load-resisting and/or load-supporting structure made of thin-walled square tubing and connected with square, non-twisting couplings, the improvement which comprises a plurality of tubular structural members made of thin-walled, square tubing and arranged vertically and horizontally to constitute the load-resisting and/or load-supporting structure, and a plurality of square, non-twisting couplings connecting adjoining tubing vertically and horizontally and having strength to resist and support any load transmitted from one member to another, each of said couplings comprising a tubular connecting member having a square cross section, at least two open ended tubular branches in said connecting member, each of said branches being adapted to receive, engage, and bind a structural member therein, a screw retaining flange provided on the outside corner of said tubular connecting member adjacent each end thereof and extending diagonally outwardly from a corner and lengthwise for a sufficient distance to accommodate at least two set screws therein; and at least two set screws in each of said flanges adapted when turned inwardly to diagonally engage a corner of a structural member to produce a binding, distorting, and expanding effect on the walls thereof to force the opposing exterior surfaces of the structural member uniformly against the contacting interior surfaces of the coupling to provide an effective frictional engagement possessing high strength, said tubular structural members connected with said couplings constituting a load-resisting and/or load-supporting structure capable of sustaining loads without collapsing and without longitudinal slipping.

2. In a load-resisting and/or load-supporting structure made of thin-walled square tubing and connected with square, non-twisting couplings as set forth in claim 1 in which each of the square, non-twisting couplings is made of metal.

3. A load-resisting and/or load-supporting structure made of thin-walled square tubing and connected with square, non-twisting couplings as set forth in claim 1 in which each of the couplings is composed of white metal.

4. A load-resisting and/or load-supporting structure made of thin-walled square tubing and connected with square, non-twisting couplings as set forth in claim 1 in which each of the couplings comprises stainless steel.

5. In a load-resisting and/or load-supporting structure made of thin-walled metallic square tubing and connected with square, non-twisting couplings, the improvement which comprises a plurality of metallic tubular structural members made of thin-walled, metallic square tubing and arranged vertically and horizontally to constitute the load-resisting and/or load-supporting structure, and a plurality of square, non-twisting metallic couplings connecting adjoining metallic tubing vertically and horizontally and having strength to resist and support any load transmitted from one member to another, each of said couplings comprising a strong metallic tubular connecting member having a square cross section, at least two open ended tubular branches in said connecting member, each of said branches having strong metallic walls and being adapted to receive, engage, and bind a metallic structure member therein, a strong metallic screw retaining flange provided on the outside corner of said tubular connecting member adjacent each end thereof and extending diagonally outwardly from a corner and lengthwise for a sufficient distance to accommodate at least two set screws therein; and at least two metallic set screws in each of said flanges adapted when turned inwardly to diagonally engage a corner of a metallic structural member to produce a binding, distorting, and expanding effect on the walls thereof to force the opposing exterior metallic surfaces of the structural member uniformly against the contacting interior metallic surfaces of the coupling to provide an effective frictional engagement possessing high strength, and a strong metallic tapered safety pin extending diagonally through the coupling via a pre-formed bore in the strong flange and in the diagonal corner as well as through corresponding pre-formed bores in the mounted tubing to provide a securely locked joint, said tubular structural members connected with said couplings constituting a load-resisting and/or load-supporting structure capable of sustaining loads without collapsing and without longitudinal slipping.

6. In a load-resisting and/or load-supporting structure made of thin-walled polygonal tubing and connected with polygonal, non-twisting couplings, the improvement which comprises a plurality of tubular structural members made of thin-walled polygonal tubing and arranged vertically and horizontally to constitute the load-resisting and/or load-supporting structure, and a plurality of polygonal non-twisting couplings connecting adjoining tubing vertically and horizontally and having strength to resist and support any load transmitting from one member to another, each of said couplings comprising a tubular connecting member having a polygonal cross section, at least two open ended tubular branches in said connecting member, each of said branches being adapted to receive, engage, and bind a structural member therein, a screw retaining flange provided on the outside corner of said tubular connecting member adjacent each end thereof and extending diagonally outwardly from a corner and lengthwise for a sufficient distance to accommodate at least two set screws therein; and at least two set screws in each of said flanges adapted when turned inwardly to diagonally engage a corner of a structural member to produce a binding, distorting, and expanding effect on the walls thereof to force the opposing exterior surfaces of the structural member uniformly against the contacting interior surfaces of the coupling to provide an effective frictional engagement possessing high strength, said tubular structural members connected with said couplings constituting a load-resisting and/or load-supporting structure capable of sustaining loads without collapsing and without longitudinal slipping.

7. In a load-resisting and/or load-supporting structure made of thin-walled polygonal tubing and connected with polygonal, non-twisting couplings, the improvement which comprises a plurality of tubular structural members made of thin-walled, polygonal tubing and arranged vertically and horizontally to constitute the load-resisting and/or load-supporting structure, and a plurality of polygonal, non-twisting couplings connecting adjoining tubing vertically and horizontally and having strength to resist and support any load transmitted from one member to another, each of said couplings comprising a tubular connecting member having a polygonal cross section, at least two open ended tubular branches in said connecting member, each of said branches being adapted to receive, engage, and bind a structural member therein, a screw retaining flange provided on the outside corner of said tubular connecting member adjacent each end thereof and extending diagonally outwardly from a corner and lengthwise for a sufficient distance to accommodate at least two set screws therein; at least two set screws in each of said flanges adapted when turned inwardly to diagonally engage a corner of a structural member to produce a binding, distorting, and expanding effect on the walls thereof to force the opposing exterior surfaces of the structural member uniformly against the contacting interior surfaces of the couplings to provide an effective frictional engagement possessing high strength; and a special tapered safety pin extending substantially diagonally through the coupling via a pre-formed bore in the strong flange and in a diagonally located wall as well as through corresponding pre-formed bores in the mounted tubing to provide a securely locked joint, said tubular structural members connected with said couplings constituting a load-resisting and/or load-supporting structure capable of sustaining loads without collapsing and without longitudinal slipping.

8. A novel, polygonal, non-twisting metallic coupling device for interconnecting multi-faceted, metallic tubular structural members for use in load-resisting and/or load-supporting structures including various diversified structures, said coupling device comprising a metallic tubular connecting member having a polygonal cross section; at least two open ended tubular metallic branches in said connecting member, each of said branches constituted of rugged strong walls and being adapted to receive, engage, and bind a metallic structural member therein; a rugged screw-retaining flange integrally incorporated with the outside corner of said tubular connecting member and extending adjacent each end thereof, each flange projecting diagonally outwardly from a corner and having a sufficiently large structure and high strength to accommodate at least two Allen-type set screws therein; at least two Allen-type set screws positioned in each of said flanges and being strong enough when turned inwardly to diagonally engage a corner of a metallic structural member to produce a forceful binding effect between the interior metallic surfaces of the coupling and the exterior metallic surface of the engaged structural member whereby collapsing of the structure will be inhibited and structural strengthening will be provided and whereby longitudinal slipping will be prevented; and a special tapered safety pin extending substantially diagonally through the coupling via a pre-formed bore in the strong flange and in a diagonally located wall as well as through corresponding pre-formed bores in the engaged structural member to provide a securely locked joint.

9. A non-twistable coupling device for interconnecting multi-faceted structural tubing for the support of load-resisting and/or load-supporting structures and the like, said coupling comprising a tubular body of square cross section possessing high strength; at least two open ends in said body constituting tubular branches adapted to receive structural tubing therein; an internal rib on an interior wall of said body intermediate the ends of said aligned branches adapted to position the structural tubing in said body; at least a pair of screw-retaining flanges provided on the outside corner of said tubular body, each flange extending outwardly and diagonally from a corner of a branch so as to bisect the apex of said corner and extending lengthwise of said branch a sufficient distance to accommodate at least a pair of Allen-type screws therein; two sets of Allen-type screws in each of said flanges adapted when turned inwardly to diagonally engage a corner of a structural tubing so as to jam the exterior planar surfaces thereof against the juxtaposed interior surfaces of said tubular branches and to provide high frictional holding forces; and a strong tapered safety pin extending diagonally through the coupling via a preformed bore in the strong flange and in the diagonal corner as well as through corresponding pre-formed bores in the engaged tubing to provide a securely locked joint.

10. A novel square non-twisting coupling for interconnecting a plurality of multi-faceted structural members made of thin walled square metallic tubing, said coupling comprising a tubular body having a plurality of branches; each of said branches being square in cross section and adapted to receive one of said thin-walled square metallic tubing therein; a flange located on an exterior corner of each branch extending substantially the full length thereof and projecting diagonally from a pair of adjacent intersecting side walls of said flange so as to substantially bisect the apex of said intersecting walls; and at least a pair of Allen-type set screws spaced along the flange on each branch thereof, each screw being housed entirely within the flange and strong enough when turned inwardly to engage a corner of said thin-walled square metallic tubing in such branch and to distort said corner to a degree whereby the exterior surfaces of said thin-walled square metallic tubing will be expanded into jamming engagement with the interior walls of said branch and whereby high frictional holding forces will be developed to provide strength to the interconnected structural members.

11. A novel, square, non-twisting metallic coupling device as set forth in claim 10 in which the coupling device is made in the form of an integral metallic casting.

12. A novel, square, non-twisting metallic coupling device as set forth in claim 10 in which an internal rib is provided at about the mid-point within the coupling device to position thin-walled tubing in each of said open-ended tubular metallic branches.

13. A novel, square, non-twisting metallic coupling device as set forth in claim 10 in which each Allen-type screw is provided with knurled, cutting teeth at its end to cut, dig and penetrate into the corner of thin-walled tubing in each of said open-ended tubular metallic branches.

14. A novel, square, non-twisting metallic coupling device as set forth in claim 10 in which a strong tapered safety pin extends diagonally through the coupling via a pre-formed bore in the rugged, screw-retaining flange and in the diagonal corner as well as through corresponding pre-formed bore in thin-walled tubing.

15. A novel, square, non-twisting metallic coupling device as set forth in claim 10 in which the coupling device is made in the form of a union.

16. A novel, square, non-twisting metallic coupling device as set forth in claim 10 in which the coupling device is made in the form of a T.

17. A novel, square, non-twisting metallic coupling device as set forth in claim 10 in which the coupling device is made in the form of a cross-over unit.

18. A novel, square, non-twisting metallic coupling device as set forth in claim 10 in which the coupling is made in the form of a corner unit.

19

19. A novel, square, non-twisting metallic coupling device as set forth in claim 10 in which the coupling device is made in the form of a by-pass unit.

References Cited

UNITED STATES PATENTS

| | | | |
|---|---|---|---|
| 1,386,947 | 8/1921 | Quinn | 248—44 |
| 1,601,819 | 10/1926 | Ganster | 211—182 X |
| 1,782,779 | 11/1930 | Fullman | 285—404 X |
| 2,185,948 | 1/1940 | Pimm | 287—54.1 X |
| 2,447,221 | 8/1948 | Warring | 285—383 X |
| 2,571,337 | 10/1951 | Burnham | 211—182 X |
| 2,866,658 | 12/1958 | Cummings | 287—58 |
| 3,272,582 | 9/1966 | Anderson et al. | 211—182 X |

FOREIGN PATENTS

| | | |
|---|---|---|
| 538,103 | 5/1955 | Belgium. |
| 677,347 | 8/1952 | Great Britain. |

THOMAS F. CALLAGHAN, Primary Examiner

U.S. Cl. X.R.

108—101; 182—178; 211—153; 285—404; 287—54